(12) United States Patent
Ho et al.

(10) Patent No.: US 11,846,796 B1
(45) Date of Patent: Dec. 19, 2023

(54) BACKLIGHT MODULE

(71) Applicant: Chicony Power Technology Co., Ltd., New Taipei (TW)

(72) Inventors: Hsuan-Wei Ho, New Taipei (TW); Chun-Ming Huang, New Taipei (TW); Chen-Hao Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/053,378

(22) Filed: Nov. 8, 2022

(30) Foreign Application Priority Data

Jun. 22, 2022  (TW) .................................. 111123197

(51) Int. Cl.
*F21V 8/00* (2006.01)
*G06F 3/0354* (2013.01)
*G02F 1/1335* (2006.01)

(52) U.S. Cl.
CPC ............ *G02B 6/005* (2013.01); *G02B 6/009* (2013.01); *G02B 6/0055* (2013.01); *G02B 6/0088* (2013.01); *G02B 6/0091* (2013.01); *G02B 6/0093* (2013.01); *G06F 3/03547* (2013.01); *G02F 1/133512* (2013.01)

(58) Field of Classification Search
CPC .... G02B 6/005; G02B 6/0055; G02B 6/0088; G06F 3/03547
See application file for complete search history.

(56) References Cited

U.S. PATENT DOCUMENTS 11,474,632 B1 * 10/2022 Ho .................. G06F 3/0412
2013/0235611 A1   9/2013 Franklin et al.
2015/0002782 A1   1/2015 Kim et al.
2015/0185409 A1 * 7/2015 Kim .................. G02B 6/0088
                                                            362/606
2017/0045676 A1 * 2/2017 Zhou ................... G02B 6/005
2019/0011778 A1   1/2019 Feng et al.
2019/0146145 A1 * 5/2019 Gu ..................... G02B 6/0088
                                                            362/607

(Continued)

FOREIGN PATENT DOCUMENTS

CN    102086993 A      6/2011
CN    103234160 A  *   8/2013
CN    105807489 A      7/2016

(Continued)

*Primary Examiner* — Keith G. Delahoussaye (74) *Attorney, Agent, or Firm* — CKC & Partners Co., LLC (57) ABSTRACT

A backlight module includes a glass substrate, a light-outputting sheet, a light guide plate, and a reflective sheet. The light-outputting sheet is disposed under the glass substrate and has a light-outputting region and a light-shielding region. The light-outputting region is disposed corresponding to the glass substrate. The light-shielding region is disposed corresponding to an outer periphery of the glass substrate. The light guide plate is disposed under the light-outputting sheet and has a light guide region and a light mixing region. The light guide region is disposed corresponding to the light-outputting region. The light mixing region is configured to receive light of a light-emitting element and guide the light to the light guide region. The light leaves the light guide region and then sequentially propagates through the light-outputting region and the glass substrate. The reflective sheet is disposed under the light guide plate.

10 Claims, 4 Drawing Sheets

(56) References Cited

U.S. PATENT DOCUMENTS

2019/0212489 A1 * 7/2019 Xu .................. G02F 1/1335

FOREIGN PATENT DOCUMENTS

| CN | 107238975 | A |   | 10/2017 |
|----|-----------|---|---|---------|
| CN | 108873148 | A |   | 11/2018 |
| CN | 209784699 | U |   | 12/2019 |
| KR | 20140058991 | A | * | 5/2014 |
| KR | 20170117695 | A | * | 10/2017 |
| TW | M491855 | U |   | 12/2014 |
| TW | 201516494 | A |   | 5/2015 |
| TW | M510491 | U |   | 10/2015 |
| TW | 201602879 | A |   | 1/2016 |
| TW | 202020492 | A |   | 6/2020 |
| TW | 202034033 | A |   | 9/2020 |

* cited by examiner

BACKLIGHT MODULE

CROSS-REFERENCE TO RELATED APPLICATION

This application claims priority to Taiwan Application Serial Number 111123197, filed Jun. 22, 2022, which is herein incorporated by reference.

BACKGROUND

Technical Field

The present disclosure relates to a touchpad device, and more particularly, to a backlight module used in a touchpad device.

Description of Related Art

The appearances of traditional touchpad devices are usually monotonous and dull, so computer peripheral manufacturers have developed illuminated touchpad devices with excellent visual effects. The backlight modules used in the traditional touchpad devices are composed of two parts, which are the light-shielding layer and the light guide plate from top to bottom.

A conventional method of glue application is to apply glue all over the non-light-emitting area, thereby avoiding the problem of accidental touch, but the luminous efficiency is poor (wasted in the non-light-emitting area). In order to increase the luminous efficiency, another conventional method of glue application is to apply the glue around the light-emitting area in a quadrilateral shape, but this will cause the problem of accidental touch. Furthermore, in the case of a mode in which the entire surface needs to emit light, a light leakage problem of displaying a bright border around the backlight module will occur, resulting in poor user experience.

Accordingly, how to provide a backlight module to solve the aforementioned problems becomes an important issue to be solved by those in the industry.

SUMMARY

An aspect of the disclosure is to provide a backlight module that can efficiently solve the aforementioned problems.

According to an embodiment of the disclosure, a backlight module includes a glass substrate, a light-outputting sheet, a light guide plate, and a reflective sheet. The light-outputting sheet is disposed under the glass substrate and has a light-outputting region and a light-shielding region. The light-outputting region is disposed corresponding to the glass substrate. The light-shielding region is disposed corresponding to at least a part of an outer periphery of the glass substrate. The light guide plate is disposed under the light-outputting sheet and has a light guide region and a light mixing region. The light guide region is disposed corresponding to the light-outputting region. The light mixing region is configured to receive light emitted by a light-emitting element and guide the light to the light guide region. The guided light leaves the light guide region and then sequentially propagates through the light-outputting region and the glass substrate. The reflective sheet is disposed under the light guide plate.

In an embodiment of the disclosure, the light-outputting sheet is connected to the reflective sheet with the light-shielding region.

In an embodiment of the disclosure, the light-outputting sheet has an opaque coating layer thereon. The light-shielding region is defined by the opaque coating layer.

In an embodiment of the disclosure, the backlight module further includes a first light-shielding member. The first light-shielding member covers the light mixing region and upper and outer sides of the light-emitting element.

In an embodiment of the disclosure, the light guide plate has a light-outputting surface. The light mixing region is defined by an orthographic projection of the first light-shielding member on the light-outputting surface.

In an embodiment of the disclosure, the backlight module further includes a second light-shielding member. The second light-shielding member covers the light-shielding region, a side surface of the light guide plate, and a part of a lower surface of the reflective sheet.

In an embodiment of the disclosure, the light-outputting sheet has a light-outputting surface. The light-shielding region is defined by an orthographic projection of the second light-shielding member on the light-outputting surface.

In an embodiment of the disclosure, when viewed from a side of the glass substrate away from the light-outputting sheet, the second light-shielding member is substantially U-shaped.

In an embodiment of the disclosure, when viewed from a side of the glass substrate away from the light-outputting sheet, an area of the light guide plate is greater than an area of the glass substrate.

According to an embodiment of the disclosure, a backlight module includes a light-emitting element, a reflective sheet, a light guide plate, a light-outputting sheet, and a glass substrate. The light-emitting element is disposed on a circuit board. The reflective sheet is disposed above the circuit board and has a side surface facing the light-emitting element. The light guide plate is disposed above the reflective sheet and has a light mixing region. The light mixing region has a side surface facing the light-emitting element. The light mixing region is configured to receive light emitted by the light-emitting element. The light-outputting sheet is disposed above the light guide plate and has a side surface facing the light-emitting element, a light-outputting region, a first light-shielding region, and a second light-shielding region. The first light-shielding region is connected to the side surface of the light-emitting sheet and disposed corresponding to the light mixing region. The glass substrate is correspondingly disposed above the light-outputting region. The second light-shielding region surrounds at least a part of an outer periphery of the glass substrate. The light leaves the light guide plate and then sequentially propagates through the light-outputting region and the glass substrate.

In an embodiment of the disclosure, the light-outputting sheet is connected to the reflective sheet with the second light-shielding region.

In an embodiment of the disclosure, the light-outputting sheet has an opaque coating layer thereon. The second light-shielding region is defined by the opaque coating layer.

In an embodiment of the disclosure, the backlight module further includes a first light-shielding member. The first light-shielding member covers the first light-shielding region, upper and outer sides of the light-emitting element, and at least a part of an outer side of the circuit board.

In an embodiment of the disclosure, the light guide plate has a light-outputting surface. The light mixing region is defined by an orthographic projection of the first light-shielding member on the light-outputting surface.

In an embodiment of the disclosure, the backlight module further includes a second light-shielding member. The second light-shielding member covers the second light-shielding region, a side surface of the light guide plate, and a part of a lower surface of the reflective sheet.

In an embodiment of the disclosure, the light-outputting sheet has a light-outputting surface. The second light-shielding region is defined by an orthographic projection of the second light-shielding member on the light-outputting surface.

In an embodiment of the disclosure, when viewed from a side of the glass substrate away from the light-outputting sheet, the second light-shielding member is substantially U-shaped.

In an embodiment of the disclosure, when viewed from a side of the glass substrate away from the light-outputting sheet, an area of the light guide plate is greater than an area of the glass substrate.

In an embodiment of the disclosure, when viewed from a side of the glass substrate away from the light-outputting sheet, an area of the light guide plate is smaller than an area of the light-outputting sheet.

Accordingly, in the backlight module of the present disclosure, by making the light-shielding region on the light-outputting sheet between the glass substrate and the light guide plate be disposed corresponding to at least a part of the outer periphery of the glass substrate, and covering all side surfaces of the light guide plate by the first light-shielding member and the second light-shielding member, the problem of light leakage that a bright border is displayed on the light-outputting surface of the light guide plate caused by the light exiting from the side surfaces of the light guide plate can be effectively avoided. In addition, the light uniformity can be effectively increased by the light guide plate receiving the light emitted by the light-emitting element in the light mixing region first, and then guiding the light away from the light guide plate by the light guide region.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
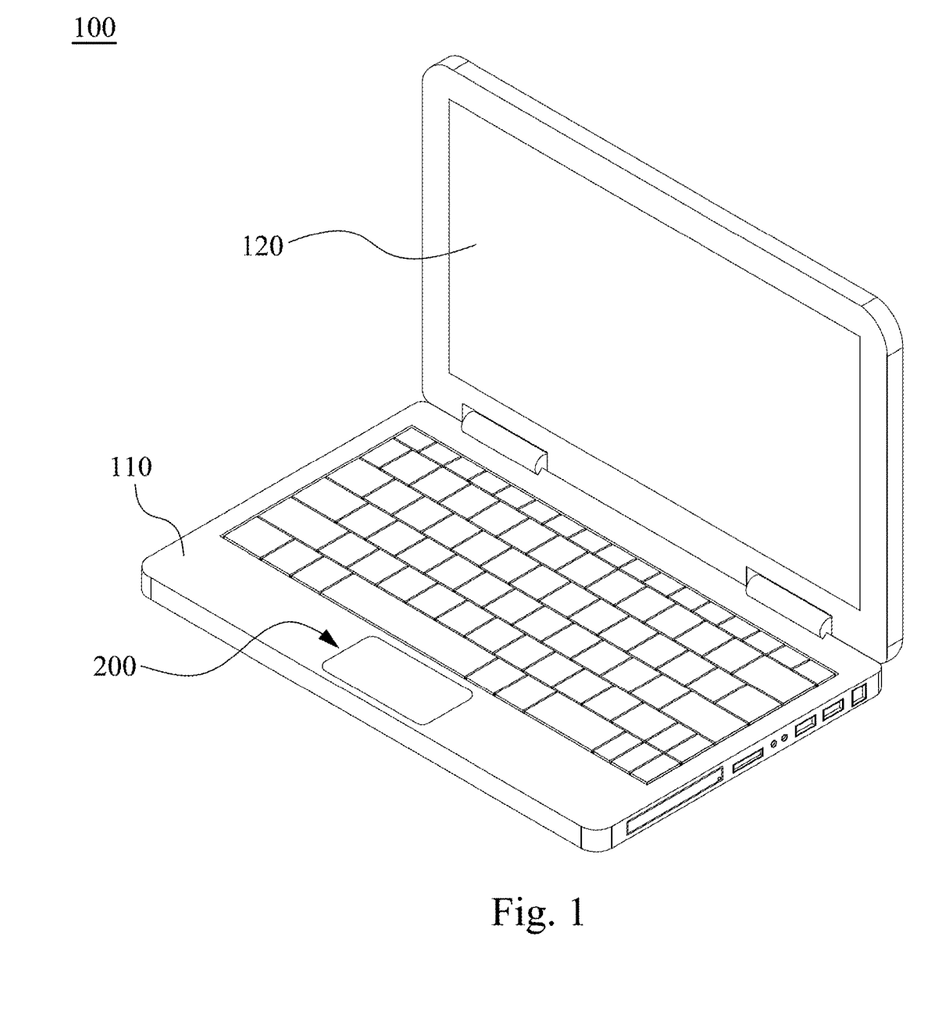
FIG. 1 is a perspective view of an electronic device according to an embodiment of the disclosure.

Reference is made to FIG. 1. FIG. 1 is a perspective view of an electronic device 100 according to an embodiment of the disclosure. As shown in FIG. 1, in the present embodiment, the electronic device 100 includes a host 110, a display 120, and a touchpad device. The touchpad device is an input device disposed in the host 110, but the present disclosure is not limited in this regard. In practical applications, the touchpad device can also be an electronic product (e.g., a personal digital assistant, a keyboard including a touchpad, etc.) using a touchpad as an input or operation interface. That is, concepts of the touchpad device of the present disclosure may be applied to any electronic product using a touchpad as an input or operation interface. The structures and functions of some elements included in the touchpad device and the connections and operation relationships among these elements will be described in detail below.

Figure 2:
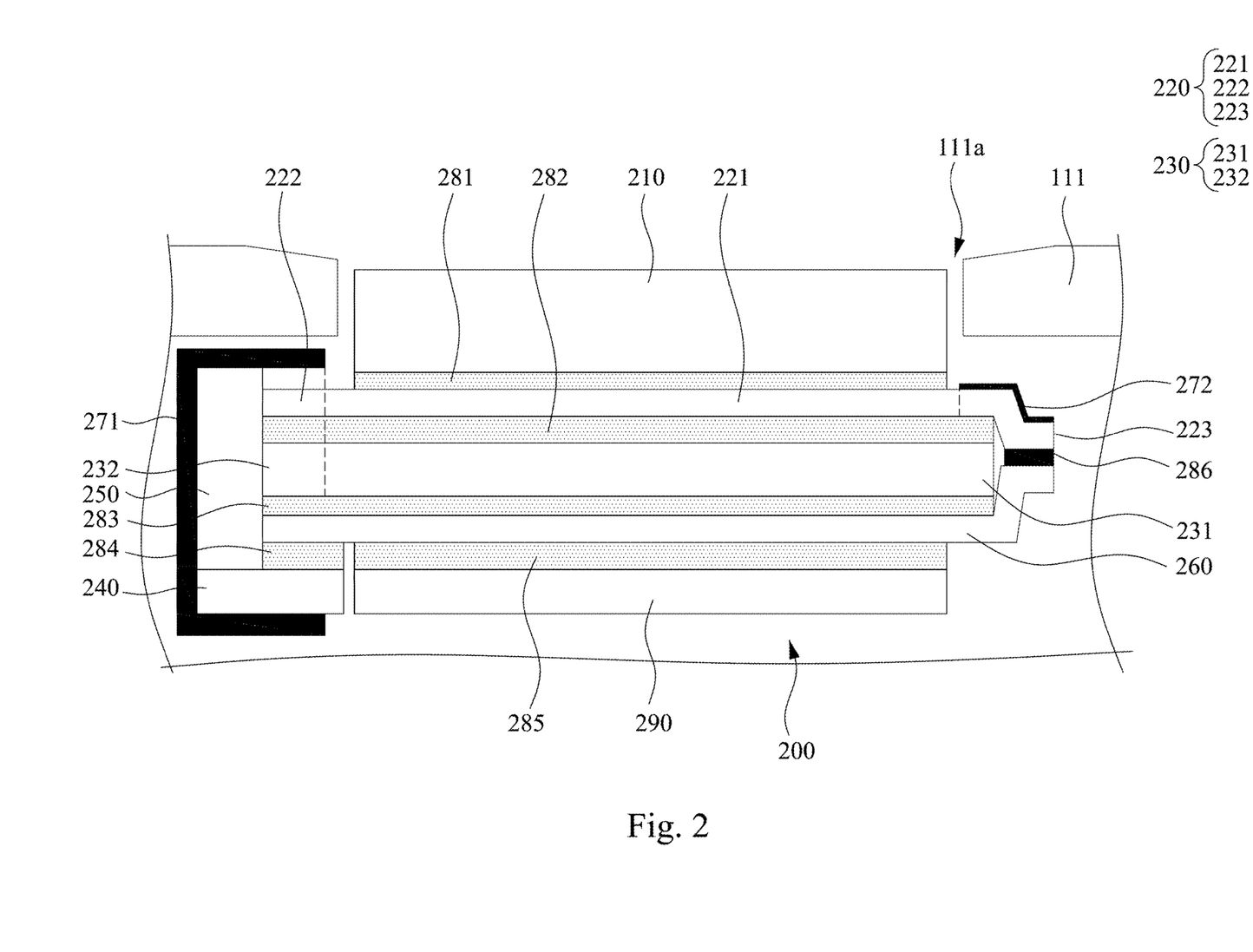
FIG. 2 is a partial cross-sectional view of the electronic device according to an embodiment of the disclosure.

Reference is made to FIG. 2. FIG. 2 is a partial cross-sectional view of the electronic device 100 according to an embodiment of the disclosure. As shown in FIG. 2, in the present embodiment, the touchpad device is an input device disposed in the host 110 and includes a backlight module 200 and a touch circuit board 290. The touch circuit board 290 is disposed under the backlight module 200. The backlight module 200 includes a glass substrate 210, a light-outputting sheet 220, a light guide plate 230, a circuit board 240, a light-emitting element 250, and a reflective sheet 260. The glass substrate 210 is exposed by an opening 111a of a housing 111 of the host 110. The outer periphery of the glass substrate 210 and the inner periphery of the opening 111a are close to each other and have substantially the same shape. The light-outputting sheet 220 is disposed under the glass substrate 210 and has a light-outputting region 221, a first light-shielding region 222, and a second light-shielding region 223. The light-outputting region 221 of the light-outputting sheet 220 is disposed corresponding to the glass substrate 210 in an up and down direction. The second light-shielding region 223 of the light-outputting sheet 220 is disposed corresponding to at least a part of an outer periphery of the glass substrate 210. The light guide plate 230 is disposed under the light-outputting sheet 220 and has a light guide region 231 and a light mixing region 232. The light guide region 231 of the light guide plate 230 is disposed corresponding to the light-outputting region 221 of the light-outputting sheet 220 up and down. The circuit board 240 is disposed under the light guide plate 230. The light-emitting element 250 is disposed on the circuit board 240. The reflective sheet 260 is disposed above the circuit board 240. The reflective sheet 260, the light mixing region 232 of the light guide plate 230, and the light-outputting sheet 220 each have a left side surface facing the light-emitting element 250. The first light-shielding region 222 of the light-outputting sheet 220 is adjacent to the left side surface thereof, and is disposed corresponding to the light mixing region 232 of the light guide plate 230 up and down. The light mixing region 232 of the light guide plate 230 is configured to receive light emitted by the light-emitting element 250 and guide the light to the light guide region 231. The guided light leaves the light guide region 231 and then sequentially propagates through the light-outputting region 221 and the glass substrate 210. The reflective sheet 260 is disposed under the light guide plate 230.

Under the foregoing structural configurations, since the light emitted by the light-emitting element 250 is uniformly mixed in the light mixing region 232 of the light guide plate 230 first, and then leaves the light guide plate 230 from the light guide region 231 of the light guide plate 230, the uniformity of the light can be effectively increased.

In some embodiments, the light-outputting sheet 220 is a diffusing sheet to increase the uniformity of light, but the present disclosure is not limited in this regard.

As shown in FIG. 2, in the present embodiment, the backlight module 200 further includes a first light-shielding member 271. The first light-shielding member 271 covers the light mixing region 232 of the light guide plate 230 and upper and outer sides of the light-emitting element 250. The light guide plate 230 has a light-outputting surface (That is, the upper surface of the light guide plate 230 in FIG. 2). In some embodiments, the light mixing region 232 of the light guide plate 230 is defined by an orthographic projection of the first light-shielding member 271 on the light-outputting surface of the light guide plate 230, but the present disclosure is not limited in this regard. In some embodiments, the first light-shielding region 222 is defined by an orthographic projection of the first light-shielding member 271 on the light-outputting sheet 220, but the present disclosure is not limited in this regard.

In some embodiments, the material of the first light-shielding member 271 includes plastic, but the present disclosure is not limited in this regard. In some embodiments, the first light-shielding member 271 is a black polyester (Mylar) film, but the present disclosure is not limited in this regard.

As shown in FIG. 2, in the present embodiment, the backlight module 200 further includes a second light-shielding member 272. The second light-shielding member 272 covers the second light-shielding region 223. The light-outputting sheet 220 has a light-outputting surface (That is, the upper surface of the light-outputting sheet 220 in FIG. 2). The second light-shielding region 223 is defined by an orthographic projection of the second light-shielding member 272 on the light-outputting surface of the light-outputting sheet 220.

As shown in FIG. 2, in the present embodiment, the second light-shielding member 272 is an opaque coating layer. The second light-shielding region 223 of the light-outputting sheet 220 is defined by the opaque coating layer. In the present embodiment, the opaque coating layer is applied on a side of the light-outputting sheet 220 away from the light guide plate 230, but the present disclosure is not limited in this regard. In practical applications, the opaque coating layer may be coated on a side of the light-outputting sheet 220 close to the light guide plate 230.

As shown in FIG. 2, in the present embodiment, the light-outputting sheet 220 is connected to the reflective sheet 260 with the second light-shielding region 223 at the right side surface of the light guide plate 230. In this way, the second light-shielding region 223 of the light-outputting sheet 220 and the reflective sheet 260 can jointly cover the side surfaces of the light guide plate 230 together.

Under the foregoing structural configurations, in the backlight module 200 of the present embodiment, the first light-shielding member 271 and the second light-shielding member 272 can effectively avoid the problem of light leakage that a bright border is displayed on the light-outputting surface of the light guide plate 230 caused by the light exiting from the side surfaces of the light guide plate 230.

Figure 3:
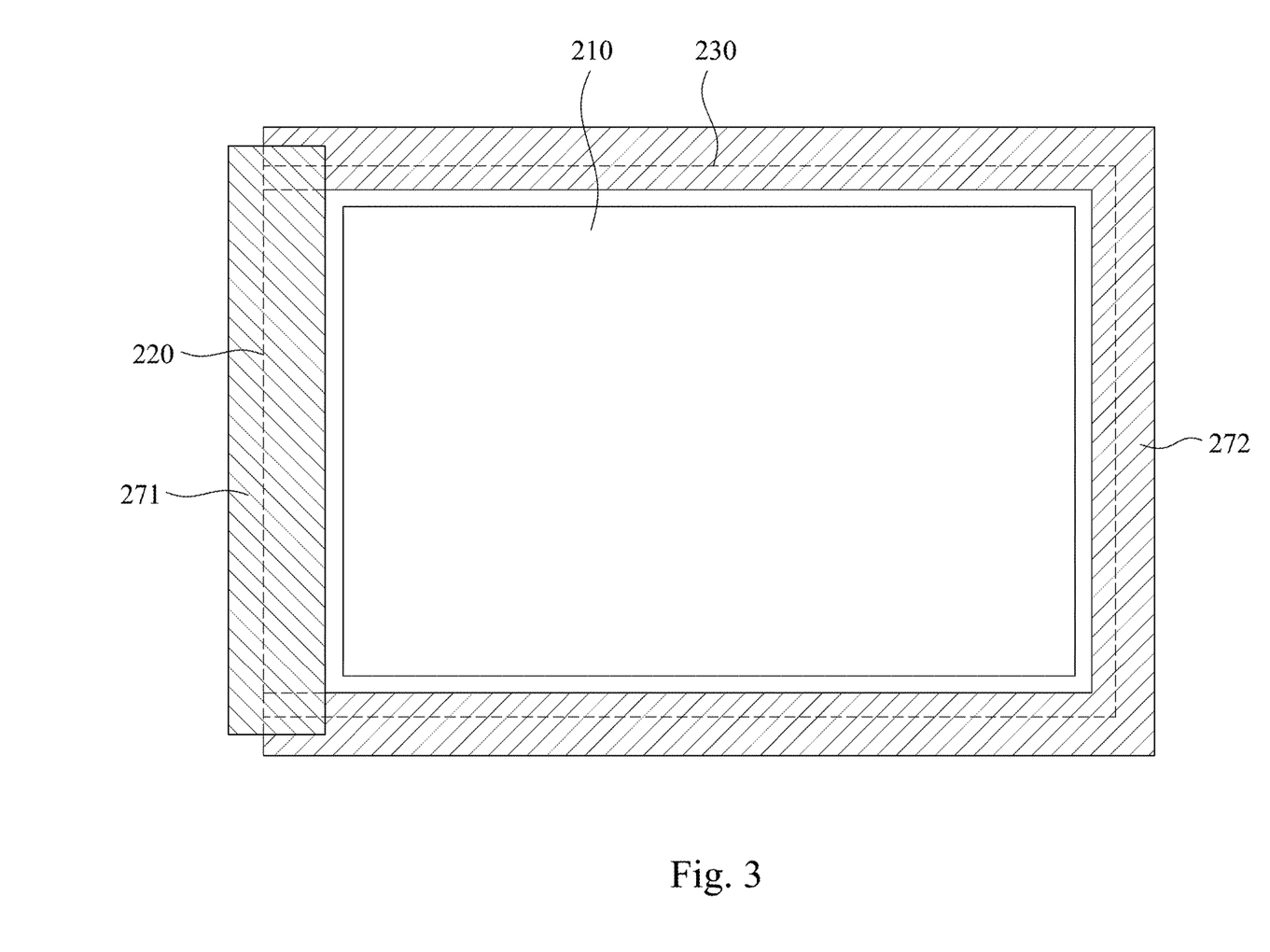
FIG. 3 is a top view of some components of a backlight module according to an embodiment of the disclosure.

Reference is made to FIG. 3. FIG. 3 is a top view of some components of the backlight module 200 according to an embodiment of the disclosure. Specifically, these components include the glass substrate 210, the light-outputting sheet 220, the light guide plate 230 (indicated by dashed lines in FIG. 3), the first light-shielding member 271, and the second light-shielding member 272. As shown in FIG. 3, in the present embodiment, when viewed from a side of the glass substrate 210 away from the light-outputting sheet 220, an area of the light guide plate 230 is smaller than an area of the light-outputting sheet 220. Furthermore, at least three edges of the outer periphery of the light guide plate 230 are within the outer periphery of the light-outputting sheet 220. In addition, when viewed from the side of the glass substrate 210 away from the light-outputting sheet 220, the second light-shielding member 272 is substantially U-shaped and corresponds to the aforementioned at least three edges of the light guide plate 230, and the first light-shielding member 271 corresponds to the fourth edges of the light guide plate 230. It can be seen from this that in the present embodiment, the second light-shielding region 223 of the light-outputting sheet 220 and the reflective sheet 260 jointly cover the three side surfaces of the light guide plate 230 (i.e., except for the side surface of the light guide plate 230 facing the light-emitting element 250), and the first light-shielding member 271 covers the fourth side surface of the light guide plate 230.

As shown in FIG. 3, in the present embodiment, when viewed from the side of the glass substrate 210 away from the light-outputting sheet 220, the area of the light guide plate 230 is greater than an area of the glass substrate 210. Furthermore, the outer periphery of the glass substrate 210 is within the outer periphery of the light guide plate 230. In this way, the side surfaces of the light guide plate 230 can be kept away from the glass substrate 210 as much as possible, thereby effectively reducing the amount of light leaving the side surfaces of the light guide plate 230 reaching the outer periphery of the glass substrate 210. Furthermore, by locating the outer periphery of the light guide plate 230 and the first light-shielding member 271 and the second light-shielding member 272 covering the side surfaces of the light guide plate 230 outside the opening 111a of the housing 111, the first light-shielding member 271 and the second light-shielding member 272 can be prevented from being seen by the user through the opening 111a.

As shown in FIG. 2, in the present embodiment, the backlight module 200 further includes connecting members 281, 282, 283, 284, 285, 286. The glass substrate 210 and the light-outputting sheet 220 are connected to each other via the connecting member 281. The light-outputting sheet 220 and the light guide plate 230 are connected to each other via the connecting member 282. The light guide plate 230 and the reflective sheet 260 are connected to each other via the connecting member 283. The circuit board 240 and the reflective sheet 260 are connected to each other via the connecting member 284. The touch circuit board 290 and the reflective sheet 260 are connected to each other via the connecting member 285. The second light-shielding region 223 of the light-outputting sheet 220 and the reflective sheet 260 are connected via the connecting member 286.

In some embodiments, at least one of the connecting members 281, 282, 283 is optical clear adhesive (OCA), but the present disclosure is not limited in this regard. In some embodiments, at least one of the connecting members 284, 285 is an adhesive tape, but the present disclosure is not limited in this regard. In some embodiments, the connecting member 286 is an opaque adhesive layer, but the present disclosure is not limited in this regard.

Figure 4:
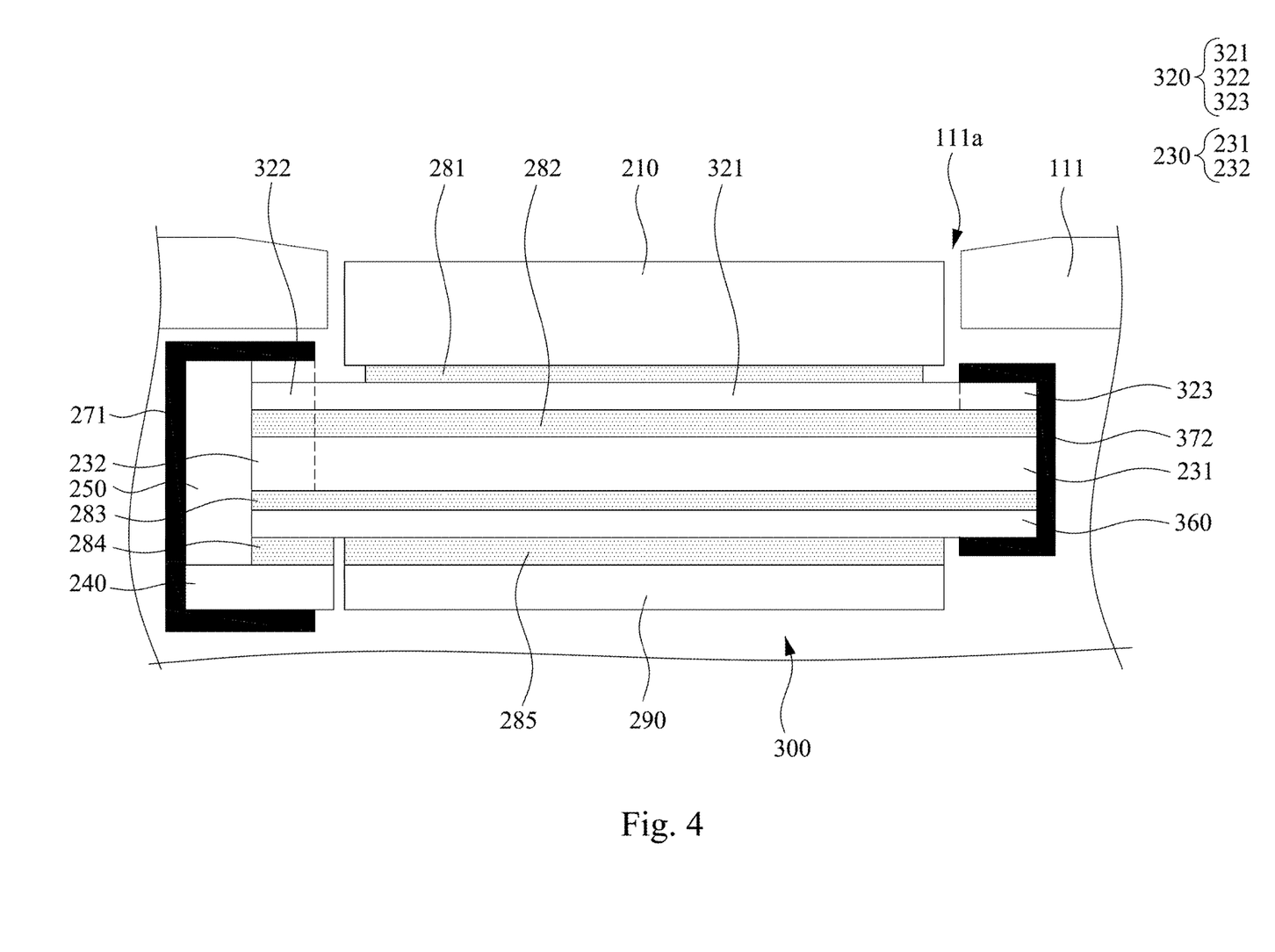
FIG. 4 is a partial cross-sectional view of the electronic device according to an embodiment of the disclosure.

Reference is made to FIG. 4. FIG. 4 is a partial cross-sectional view of the electronic device 100 according to an embodiment of the disclosure. As shown in FIG. 4, in the present embodiment, the touchpad device includes a backlight module 300 and a touch circuit board 290. The backlight module 300 includes a glass substrate 210, a light-outputting sheet 320, a light guide plate 230, a circuit board 240, a light-emitting element 250, a reflective sheet 360, a first light-shielding member 271, a second light-shielding member 372, and connecting members 281, 282, 283, 284, 285, in which the glass substrate 210, the light guide plate 230, the circuit board 240, the light-emitting element 250, the first light-shielding member 271, and connecting members 281, 282, 283, 284, 285 are the same as those in the embodiment shown in FIG. 2, so the introduction of these components can be referred to the relevant previous contents and will not be repeated here. Compared with the embodiment shown in FIG. 2, the present embodiment provides the light-outputting sheet 320, the reflective sheet 360, and the second light-shielding member 372 that are modified.

Specifically, in the present embodiment, the light-outputting sheet 320 and the reflective sheet 360 do not extend to the right side surface of the light guide plate 230, so they are not connected at the right side surface of the light guide plate 230. Alternatively, the second light-shielding member 372 of the present embodiment covers the second light-shielding region 323 of the light-outputting sheet 320, the side surfaces of the light guide plate 230 (except the side surface of the light guide plate 230 facing the light-emitting element 250), and a part of the lower surface of the reflective sheet 360. In this way, the second light-shielding member 372 can cover the side surfaces of the light guide plate 230 to avoid the problem of light leakage that a bright border is displayed on the light-outputting surface of the light guide plate 230 caused by the light exiting from the side surfaces of the light guide plate 230. In addition, the definitions of the light-outputting region 321 and the first light-shielding region 322 of the light-outputting sheet 320 are the same as those of the embodiment shown in FIG. 2, and will not be repeated here.

In some embodiments, the first light-shielding region 322 is defined by an orthographic projection of the first light-shielding member 271 on the light-outputting sheet 320, but the present disclosure is not limited in this regard. In some embodiments, the second light-shielding region 323 of the light-outputting sheet 320 is defined by an orthographic projection of the second light-shielding member 372 on the light-outputting surface of the light-outputting sheet (i.e., the upper surface of the light-outputting sheet 320 in FIG. 4). In some embodiments, similar to the embodiment in FIG. 3, when viewed from the side of the glass substrate 210 away from the light-outputting sheet 320, the second light-shielding member 372 is substantially U-shaped and corresponds to at least three sides of the light guide plate 230. In this way, the second light-shielding member 372 can cover the three side surfaces of the light guide plate 230 (i.e., except for the side surface of the light guide plate 230 facing the light-emitting element 250).

In some embodiments, the material of the second light-shielding member 372 includes plastic, but the present disclosure is not limited in this regard. In some embodiments, the second light-shielding member 372 is a black polyester film, but the present disclosure is not limited in this regard.

According to the foregoing recitations of the embodiments of the disclosure, it can be seen that in the backlight module of the present disclosure, by making the light-shielding region on the light-outputting sheet between the glass substrate and the light guide plate be disposed corresponding to at least a part of the outer periphery of the glass substrate, and covering all side surfaces of the light guide plate by the first light-shielding member and the second light-shielding member, the problem of light leakage that a bright border is displayed on the light-outputting surface of the light guide plate caused by the light exiting from the side surfaces of the light guide plate can be effectively avoided. In addition, the light uniformity can be effectively increased by the light guide plate receiving the light emitted by the light-emitting element in the light mixing region first, and then guiding the light away from the light guide plate by the light guide region.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
   a light-emitting element disposed on a circuit board;
   a reflective sheet disposed above the circuit board and having a side surface facing the light-emitting element;
   a light guide plate disposed above the reflective sheet and having a light mixing region, the light mixing region having a side surface facing the light-emitting element, wherein the light mixing region is configured to receive light emitted by the light-emitting element;
   a light-outputting sheet disposed above the light guide plate and having a side surface facing the light-emitting element, a light-outputting region, a first light-shielding region, and a second light-shielding region, the first light-shielding region being connected to the side surface of the light-outputting sheet and disposed corresponding to the light mixing region; and
   a glass substrate correspondingly disposed above the light-outputting region, the second light-shielding region surrounding at least a part of an outer periphery of the glass substrate,
   wherein the light leaves the light guide plate and then sequentially propagates through the light-outputting region and the glass substrate.

2. The backlight module of claim 1, wherein the light-outputting sheet is connected to the reflective sheet with the second light-shielding region.

3. The backlight module of claim 2, wherein the light-outputting sheet has an opaque coating layer thereon, and the second light-shielding region is defined by the opaque coating layer.

4. The backlight module of claim 1, further comprising a first light-shielding member, the first light-shielding member covering the first light-shielding region, upper and outer sides of the light-emitting element, and at least a part of an outer side of the circuit board.

5. The backlight module of claim 4, wherein the light guide plate has a light-outputting surface, and the light mixing region is defined by an orthographic projection of the first light-shielding member on the light-outputting surface.

6. The backlight module of claim 1, further comprising a second light-shielding member, the second light-shielding member covering the second light-shielding region, a side surface of the light guide plate, and a part of a lower surface of the reflective sheet.

7. The backlight module of claim 6, wherein the light-outputting sheet has a light-outputting surface, and the second light-shielding region is defined by an orthographic projection of the second light-shielding member on the light-outputting surface.

8. The backlight module of claim 6, wherein when viewed from a side of the glass substrate away from the light-outputting sheet, the second light-shielding member is substantially U-shaped.

9. The backlight module of claim 1, wherein when viewed from a side of the glass substrate away from the light-outputting sheet, an area of the light guide plate is greater than an area of the glass substrate.

10. The backlight module of claim 1, wherein when viewed from a side of the glass substrate away from the light-outputting sheet, an area of the light guide plate is smaller than an area of the light-outputting sheet.

* * * * *